Oct. 6, 1964     C. E. THARP     3,151,363
APPARATUS FOR USE IN THE PRODUCTION OF FIBROUS PRODUCTS
Filed Oct. 18, 1962
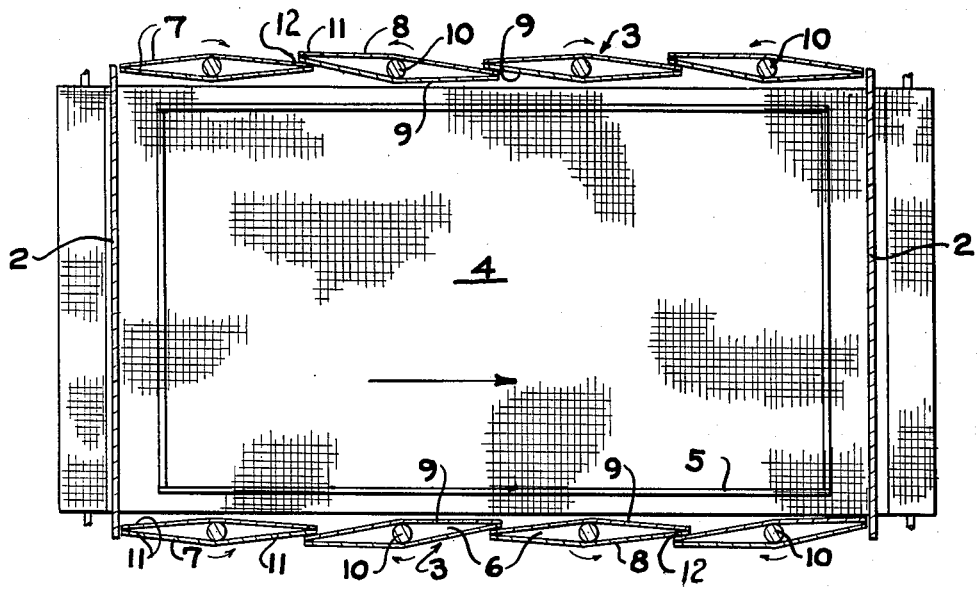
Fig. 1.
Fig. 3.
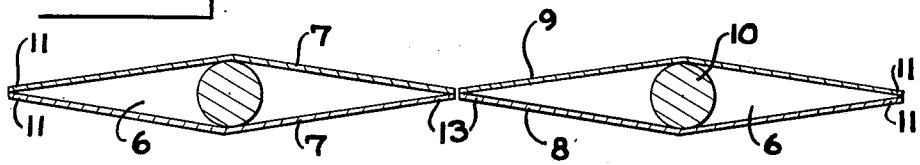
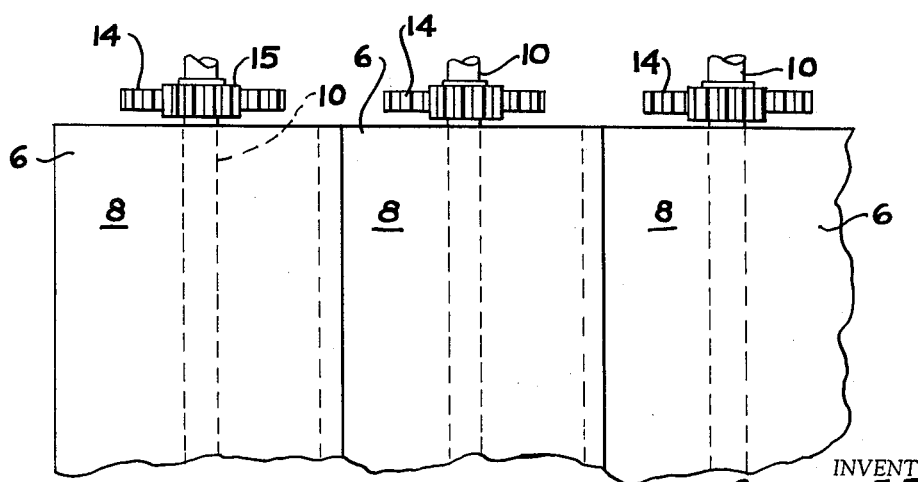
Fig. 2.
INVENTOR.
CLARENCE E. THARP
BY *John A. McKinney*
ATTORNEY

United States Patent Office 3,151,363
Patented Oct. 6, 1964

3,151,363
APPARATUS FOR USE IN THE PRODUCTION OF FIBROUS PRODUCTS
Clarence E. Tharp, Richmond, Ind., assignor to Johns-Manville Corporation, New York, N.Y., a corporation of New York
Filed Oct. 18, 1962, Ser. No. 231,514
4 Claims. (Cl. 19—156.1)

This invention relates to a collection chamber for fibrous materials and is particularly directed to a collection chamber for collecting glass fibers and to a structure for maintaining the side walls of a collection chamber used in the collection of glass fibers free from an undesirable accumulation of fibers.

One of the problems occurring during the formation of fibrous products, especially those products made from glass fibers wherein the fibers are collected in a collection chamber immediately adjacent the zone of fiberization, is the tendency for the fibers to stick to and accumulate on the side walls of the collection chamber. This continuous accumulation of fiber on the side walls of the collection chamber results in the formation of clumps which become saturated with binder and periodically fall off the side walls to become integral with the felt of fibrous material being collected on an endless moving belt in the collection chamber. The presence of these clumps in the finished product results in the rejection of such products for many reasons, such as, visual appearance, improper thermal conductivity, odor and handleability.

It is an object of the instant invention to provide a method for minimizing the accumulation of fiber on the walls of a collection chamber.

It is a further object of the instant invention to provide a construction for the walls of a collection chamber which may be effectively utilized to minimize the undesirable accumulation of fibers thereon.

The foregoing objects are accomplished in accordance with the instant invention by the method wherein the collection chamber is provided at periodic intervals with clean walls. In the preferred embodiment of the instant invention, this is accomplished by providing the collection chamber with side walls comprising a plurality of movable panels wherein each panel is mounted for rotation about a fixed axis. After the fiberization system has been in operation for ap redetermined interval of time and there has been an accumulation of fiber on the inside surface area of each panel, the panels forming the side walls are rotated about their axes through substantially 180° so that the inside surface area of each panel becomes an outside surface area and the outside surface area of each panel becomes an inside surface area. The accumulation of fibers on the former inside surface area may now be easily cleaned since these surface areas now form the outside surface of the collection chamber. This process is repeated at periodic intervals and in this manner the excessive accumulation of fibers on the side walls of the collection chamber is avoided.

The invention will be more fully understood and further objects and advantages thereof will become apparent when reference is made to the following detailed description of a preferred embodiment of the invention and the accompanying drawing in which:

FIG. 1 is a top plan view of a portion of a collection chamber;

FIG. 2 is an enlarged partial side elevation of a portion of the collection chamber; and FIG. 3 is a top plan view of a portion of a collection chamber illustrating adjacent panels of a modification of FIG. 1.

Referring to the drawings and in particular to FIGS. 1 and 2, there is illustrated a portion of a system for the collection of fibrous material and in particular the collection of glass fibers comprising a collection chamber 1 having end walls 2 and side walls 3. The bottom of the collection chamber 1 is formed by an endless, foraminous conveyor belt 4 moving in a direction indicated by the arrow and passing over a suction box 5. The fibers produced by conventional fiberizing apparatus (not shown) move with volume air through one of the end walls 2 when produced by apparatus of the type illustrated in U.S. Patent No. 2,561,843 and through the top when produced by apparatus of the type illustrated in U.S. Patent No. 3,077,751 into the collection chamber toward the suction box 5 and are deposited on the conveyor belt.

Each side wall 3 comprises a plurality of movable panels 6 formed from metallic sheets 7 so as to present broad surface areas 8 and 9 facing in opposite directions. Each panel 6 is secured by conventional means, such as spot welding, to a shaft 10 which extends through each panel in a generally longitudinal direction. Each shaft 10 is connected to means for rotating the shaft 10 and therefore each panel 6 through 180°. As illustrated in FIG. 2, one such means for rotating the shafts 10 may comprise suitable driven gears 14 in mesh with gears 15 on each shaft 10. With such an arrangement, the panels 6 may be rotated simultaneously. In the preferred embodiment of the invention as illustrated in FIGS. 1–3, the axis of rotation of each shaft 10 coincides with the longitudinal axis of its associated panel. The adjacent longitudinal edges 11 of the metallic sheets 7 are secured to each other by conventional means such as by spot welding.

In the embodiment of the invention illustrated in FIG. 1, when the panels 6 are arranged in a closed position, the adjacent longitudinal edges 12 of adjacent panels 6 contact each other in an overlapping relationship. In the embodiment of the invention illustrated in FIG. 3, when the panels 6 are arranged in closed position, the adjacent longitudinal edges 13 of adjacent panels 6 are substantially in an abutting relationship. In the embodiment of FIG. 1, the adjacent panels are rotated in opposite directions, as indicated by the arrows. However, in the embodiment of FIG. 3, the panels may be rotated in the same direction.

In operation, the panels 6 are arranged in a closed position so that the broad surface areas 9 form the inner side walls of the collection chamber 1 and the broad surface areas 8 form the outside side walls of the collection chamber 1. The fiberization of the glass fibers is initiated and such fibers are collected on the conveyor belt 4. As the glass fibers move through the collection chamber 1 to be collected on the belt 4, there is a tendency for some of these fibers to adhere to the broad surface areas 9 of the side walls 3. If these glass fibers were allowed to continue to accumulate on the side walls, they would fall off as clumps into the glass fibers being collected on the belt. The presence of these clumps in the finished product would result in the rejection of such products for many reasons, such as, visual appearance, improper thermal conductivity, odor and handleability. To prevent the undesirable accumulation of glass fibers in the broad surface areas 9, the panels 6 are rotated periodically by the shafts 10 through 180° so as to bring the inside surface areas 9 to the outside and the outside surface areas 8 to the inside. The fouled surface areas 9 are then cleaned and allowed to dry before the other surface areas 8 have reached a condition so that they must be cleaned. The operation is then repeated on a periodic basis so that an undesirable accumulation of glass fibers on the side walls of the collection chamber is avoided. By properly regulating the rotation of the panels 6, clean side walls for the collection chamber may be provided in accordance with the instant invention without interrupting the fiberization process. While the invention has been described relative to the side walls of the collection chamber, it is to be understood that the inventive concepts may be applied to any wall of the collection chamber.

It will be understood that the foregoing explanation was for illustration purposes only and these details need not be strictly adhered to and that various changes and modifications may suggest themselves to one skilled in the art, all falling within the scope of the invention as defined by the subjoined claims.

What I claim is:

1. A collection chamber for collecting glass fibers comprising:
   (a) a collection chamber comprising at least two end walls and two side walls,
   (b) at least one of said walls comprising a plurality of movable panels,
   (c) each of said panels having at any given time an inside surface area and an outside surface area,
   (d) means mounting said movable panels for rotation about generally parallel axes, and
   (e) means for rotating said panels through substantially 180° so as to move said inside surface areas to the outside and said outside surface areas to the inside.

2. A collection chamber for collecting glass fibers comprising:
   (a) a collection chamber comprising at least two end walls and two side walls,
   (b) each of said side walls comprising a plurality of movable panels,
   (c) each of said panels having at any given time an inside surface area and an outside surface area,
   (d) means mounting said movable panels for rotation about generally parallel axes,
   (e) means for rotating said panels through substantially 180° so as to move said inside surface areas to the outside and said outside surface areas to the inside, and
   (f) said axis of rotation of each panel coinciding with the longitudinal axis of each panel.

3. A collection chamber for collecting glass fibers comprising:
   (a) a collection chamber comprising at least two end walls and two side walls,
   (b) each of said side walls comprising a plurality of movable panels,
   (c) each of said panels having at any given time an inside surface area and an outside surface area,
   (d) each of said panels having longitudinally extending edge portions,
   (e) said edge portions of adjacent panels being in overlapping and contiguous relationship,
   (f) means mounting said movable panels for rotation about generally parallel axes, and
   (g) means for rotating said panels through substantially 180° so as to move said inside surface areas to the outside and said outside surface areas to the inside.

4. A collection chamber for collecting glass fibers comprising:
   (a) a collection chamber comprising at least two end walls and two side walls,
   (b) each of said side walls comprising a plurality of movable panels,
   (c) each of said panels having at any given time an inside surface area and an outside surface area,
   (d) each of said panels having longitudinally extending edge portions,
   (e) said edge portions of adjacent panels being in a substantially abutting relationship,
   (f) means mounting said movable panels for rotation about generally parallel axes, and
   (g) means for rotating said panels through substantially 180° so as to move said inside surface areas to the outside and said outside surface areas to the inside.

References Cited in the file of this patent

UNITED STATES PATENTS 2,389,024    Brownlee  ----------------  Nov. 13, 1945